United States Patent

Weddigen et al.

[11] 4,238,553
[45] Dec. 9, 1980

[54] ELECTROCHEMICAL STORAGE CELL

[75] Inventors: Gert Weddigen, Heidelberg-Neuenheim; Bernd Houpert, Plankstadt; Monika Gerlach, Mannheim, all of Fed. Rep. of Germany

[73] Assignee: Brown, Boveri & Cie Aktiengesellschaft, Mannheim-Käfertal, Fed. Rep. of Germany

[21] Appl. No.: 51,206

[22] Filed: Jun. 22, 1979

[30] Foreign Application Priority Data

Jul. 15, 1978 [DE] Fed. Rep. of Germany ....... 2831191

[51] Int. Cl.³ ............................................ H01M 10/00
[52] U.S. Cl. .................................... 429/104; 429/194; 429/191

[58] Field of Search ............... 429/104, 197, 194, 101, 429/191, 105

[56] References Cited

U.S. PATENT DOCUMENTS

| | | | |
|---|---|---|---|
| 3,730,771 | 5/1973 | Tannenberger et al. | 429/194 |
| 3,870,561 | 3/1975 | Charbonnier et al. | 429/102 |
| 3,982,958 | 9/1976 | Newman | 429/194 X |
| 4,018,969 | 4/1977 | Fischer et al. | 429/104 |
| 4,069,374 | 1/1978 | Gabano | 429/197 |

*Primary Examiner*—Anthony Skapars
*Attorney, Agent, or Firm*—Herbert L. Lerner

[57] ABSTRACT

Electrochemical storage cell or battery of the alkali metal and sulfur type operable in the range from about 100° C. to 200° C. A solvent component is added to the cathode chamber, which solvent will at least partially dissolve sulfur and is stable under the conditions of operation.

14 Claims, 2 Drawing Figures

ELECTROCHEMICAL STORAGE CELL

CROSS-REFERENCE TO RELATED APPLICATION

U.S. Application Ser. No. 051,207, filed for Gert Weddigen, Gunther Ege and Friedrich Vogtle, on June 22, 1979 (Attorney Docket Mp. 593/78) and assigned to Brown, Boveri and Cie Aktiengesellschaft, the assignee of the present invention.

BACKGROUND OF THE INVENTION

1. Field of the Invention

The invention relates to an electrochemical cell and more particularly refers to a new and improved electrochemical storage cell or battery based on alkali metal and sulfur with at least one anode chamber and one cathode chamber which are separated from each other by an ion-conducting solid electrolyte.

2. Description of the Prior Art

U.S. Pat. No. 4,018,969 relates to an electrochemical storage cell or battery, operable in the range of about 100° to 200° C., of the type using an alkali metal as the anolyte and sulfur as the catholyte. The cell has at least one anode chamber and one cathode chamber which are separated from each other by an alkali ion-conducting solid electrolyte. At least one organic aprotic solvent with a boiling point above the operating temperature of the cell is contained in the cathode chamber, for at least partially dissolving the sulfur and/or its alkali compounds.

Normally, the operating temperature of alkali metal-sulfur cells is at about 300° to 350° C. One reason therefor is the fact that at this temperature, the conductivity of the alkali ion-conducting solid electrolyte is substantially higher than at lower temperatures. The second reason is that sulfur or alkali polysulfide is used as the cathodic reaction partner, which must be present in the molten condition. These mostly used sodium polysulfides have melting points between 242° and 1200° C.

At operating temperatures of 300° to 350° C., the discharge reaction can proceed, if sodium is used, to about $Na_2S_3$ (more exactly, according to the phase diagram, to $Na_2S_{2.8}$). This corresponds to a theoretical energy density of 760 Wh/kg. If the cell is discharged further, the reaction products $Na_2S_2$ and $Na_2S$ are generated, which are solid at 300° to 350° C. In the presence of solid reaction products, the kinetics become so poor that the cell can then be charged and discharged no longer or only with a very small power density, so that the possible higher energy densities ($Na_2S$ corresponds to 1260 Wh/kg) cannot be obtained.

Through the presence of a solvent, the reaction can continue to proceed in the direction toward the more alkali-rich sulfides. The high melting point of such alkali-rich sulfides does not matter, since the sulfides are dissolved, at least partially, and the alkali metal is present in ion form, which ensures adequate reaction kinetics. If sodium is used, the discharge reaction can be carried out until the stoichiometry in the cathode chamber is $Na_2S$ instead of only $Na_2S_3$. If one neglects the mass and volume of the added solvent, the theoretical energy density is increased from 760 Wh/kg to 1260 Wh/kg. In addition, lowering the operating temperature to 100° or 200° C. has the advantage of substantially reduced danger of corrosion and permits the use of plastics as the housing part.

According to U.S. Pat. No. 4,018,969, the weight ratio of solvent to sulfur or alkali-sulfur compound can be between 1:10 and 1:1. The amount of solvent is preferably chosen so that up to 75% by weight of the compounds are present in the undissolved state, so as not to lower the energy density and the reaction rate unnecessarily by excessive amounts of solvent. Otherwise, it is recommended that several solvents which are mixed with each other be placed into the cathode chamber to dissolve the different alkali polysulfides and the sulfur itself.

The present invention relates to an improvement and further embodiment of the electrochemical storage cell or battery described in U.S. Pat. No. 4,018,969, and more particularly is directed to making available a solvent component in such cell especially suitable for dissolving sulfur. It is assumed that preferably, at least two different solvents are used. Essentially the following four criteria have been determined for the selection of suitable solvents:

The solvent should have good solubility for sulfur and at the same time, good compatibility with the heavily polar-structured solvents such as are preferred for dissolving the polysulfides as for example disclosed in related application referred to in Cross-Reference to Related Application.

The solvent with its content of dissolved alkali polysulfide must exhibit satisfactory conductivity. It should have a low dissociation voltage. Especially good chemical long-term stability of the solvent are furthermore important.

For extended operating times, it has now been found that the last mentioned point is more critical than expected in some solvents which appeared to be basically suitable. Thus, multivalent alcohols or thioalcohols were entirely satisfactory for shorter and medium operating times, but not for the planned operating times of up to 5 years, as there, the decomposition would proceed on too large a scale.

The selection of suitable solvents good chemical stability for a long term is particularly difficult, especially for dissolving the polysulfides, because the presence of polar groups in the solvent molecule is necessary. The reason for this is that the polar groups make the solvent molecules susceptible to the sulfur, where the attack of the sulfur sets in at the C-H bonds, which bonds are present in the organic solvents.

In addition to providing solvents for dissolving the polysulfides in the cathode chamber, it is also advantageous in many cases to use a solvent component which has good solubility for sulfur.

SUMMARY OF THE INVENTION

An object of the present invention is to provide a chemical storage cell or battery of the alkali metal and sulfur type with organic solvent media for dissolving polysulfides and an added solvent component having good solubility for sulfur and good compatability with the organic solvent for dissolving the polysulfides.

With the foregoing and other objects in view, there is provided in accordance with the invention an electrochemical storage cell or battery operable in the range from about 100° C. to 200° C., of the alkali metal and sulfur type, with at least one anode chamber and at least one cathode chamber separated from each other by an alkali ion-conducting solid electrolyte, and at least one organic aprotic solvent having a boiling point above the operating temperature of the cell, contained in the cathode chamber for dissolving, at least partially, alakli compounds contained in the cathode chamber, the improvement comprising adding another organic solvent component to the cathode chamber containing a compound having the general formula

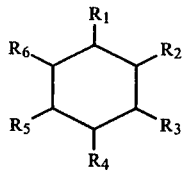

wherein $R_1$, $R_2$, $R_3$, $R_4$, $R_5$ and $R_6$ each represent a radical selected from the group A, B and C in which
A=H
B=$CH_3$
C=F, Cl, CN and SCN
and where a radical from A and C are each represented at least once and the radical of B not more than three times.

Compounds which are particularly advantageous as solvents are those above in which B and/or C are represented two to three times, and like radicals of a group are arranged as closely adjacent as possible.

Preferred compounds are p-cyanotoluol (p-tolunitrile); o-cyanotoluol (o-tolunitrile); 3,4-dicyanotoluol; 3, 4, 5-tricyanotuol; 1,2-dlcyano-4,5-dimethyl-benzene; 1-cyano-3,4,5-trimethyl-benzene; 1,2,3-tricyano-4,5,6-trimethyl-benzene; fluorobenzene; and xylol.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which:

FIG. 1 is a side elevation of a tubular containing sodium in an anode chamber and sulfur and polysulfides together with solvent in accordance with the invention in a cathode chamber; and FIG. 2 is a graph showing charging/discharging by voltage-versus-time curves which were obtained with the cell operated in accordance with the invention.

DETAILED DESCRIPTION OF THE INVENTION

Figure 1:
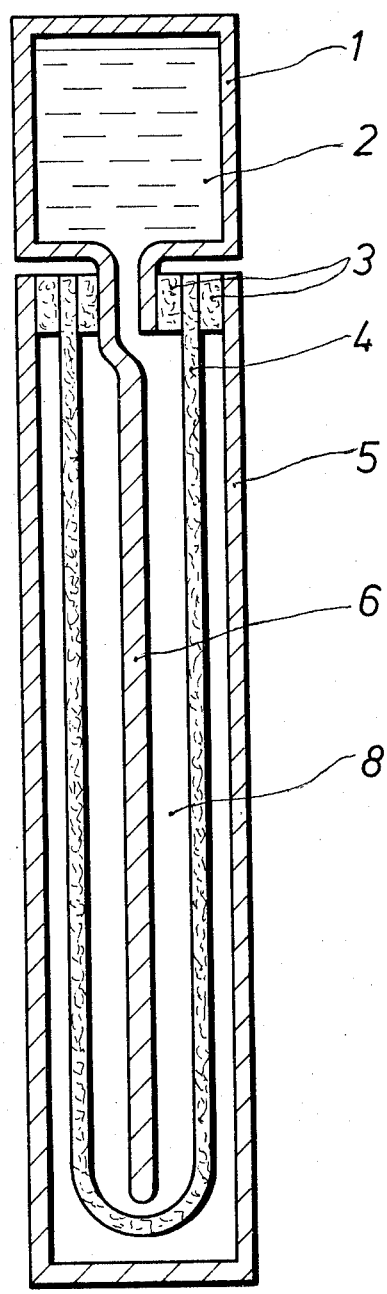

Normally, it is not necessary to employ an amount of solvents in the cathode chamber to effect solution of the entire content of polysulfides or sulfur in the cathode chamber, since the dissolution rate with the solvents of interest is as a rule higher than the speed of the electrochemical transport reaction.

This fact is favorable inasmuch as the energy density would drop to an undesirable degree if the solvent content is too high. However, enough solvent must be present so that the solvent always remains in contact with the solid electrolyte over an area as large as possible, which area may optionally be capillaryactive, in order to ensure the necessary mass transport. Measurements have shown that the undissolved content of polysulfides and sulfur can perfectly well be 75 weight % and possibly even more. A typical operating range is characterized by a weight ratio of solvent to sulfur or alkali-sulfur compounds, respectively, of 1:10 to 1:1. A ratio in which the sulfur or alkalisulfur compounds are in a greater proportion than 1:10 will not generally be chosen because the energy density already drops distinctly at this value. However, it is conceivable to go below the ratio 1:1 in the case of certain particularly advantageous solvents.

It was pointed out that with the basically highly desirable lowering of the operating temperature under U.S. Pat. No. 4,018,969, a certain disadvantage must nevertheless be tolerated, namely, the slowing-up of the electrochemical reaction and an increase of the internal resistance of the solid electrolyte. In order to compensate for this disadvantage, it is advantageous to construct the solid electrolyte or the cells, so that the boundary or reaction surface area is increased considerably over known designs, preferably 3 to 10-times. In one specific embodiment of the invention this can be accomplished by making the solid electrolyte as a cylindrical or square block of beta-$Al_2O_3$ with numerous parallel canals, the canals being filled alternatingly with alkali metal or sulfur or polysulfide.

A better utilization of the volume in the above-mentioned sense can be achieved if the solid-electrolyte body is not made cylindrical but with a square or hexagonal cross section. In this manner, cells of rather high power density with a maximum capillary reaction surface can be fabricated.

As a further measure in connection with the above-mentioned slowing-up of the reactions, the addition of tetracyanoethylene for improving the charging capacity and rate is advisable. At operating temperatures up to 150° C., tetracyanoquinomethane can also be used to special advantage. This measure is particularly suitable for low-temperature cells of the present type.

The additive according to the invention is not limited to sulfur and sulfur compounds. Other chalcogens, such as selenium, can also be added.

The invention will be explained in the following in greater detail with reference to embodiment examples, from which further features and advantages of the invention may be seen.

Referring to FIG. 1, the tubular cell contains a steel wall 1, which shields the Na-reservoir 2 against the atmosphere. By means of α-$Al_2O_3$ rings 3, which are connected to the adjoining parts by means of glass solder, the transition, on the one hand, between the β-$Al_2O_3$ ceramic 4 and the steel wall 1 and, on the other hand, that between the β$Al_2O_3$ ceramic 4 and the steel housing 5 can be effected. A steel current collector 6 is immersed in the liquid sodium 8, which is present in excess. The wall thickness of the ceramic tube 4 of β-$Al_2O_3$ is 1.5 mm. The gap width between the latter and the steel housing 5 is 2.25 mm.

Figure 2:
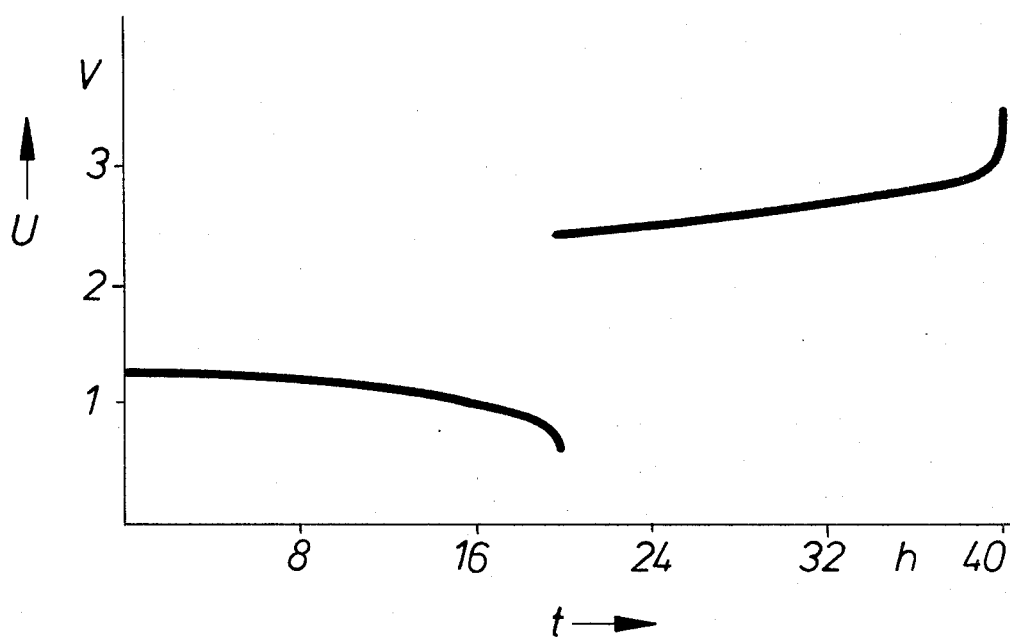

In the case of cell measurements, 250 mg graphite felt were contained between the β-$Al_2O_3$ ceramic and the steel housing. The cathode chamber also contained 960 mg sulfur, 7 ml N-N' diacetyl-N-N' dimethylethane diamine, 5 ml o-tolunitrile and 80 mg tetracyano ethylene. The cell could therewith be charged and discharged at 60 mA/$cm^2$. The cell had a temperature of 150° C. The voltage-versus-time curve of the 10th cycle is shown in FIG. 2. Stoichiometric changes between sulfur and $Na_2S$ are defined here as 100% charging and discharging. With 960 mg sulfur used, this corresponds to a theoretical capacity of 1,600 mAh. During the 10th discharging cycle, 1,200 mAh were taken out according to FIG. 2 (0 to 20 h). In the 10th charging cycle (20 to 40 h), the corresponding 1,200 mAh are stored. The cell arrangement with the specified solvents therefore permits one to cycle reversibly 75% of the theoretical capacity. Referred to the stoichiometry change between sulfur and Na₂S, only 26% of the theoretical capacity can be discharged and charged reversibly in an Na/S cell operated at 300° C.

In addition to the cell tests proper, thermal load tests were performed, with the following solvents in accordance with the invention, in the presence of sulfur; o-tolunitrile, 3,4-dicayanotoluol, fluorobenzene, xylol. For this purpose, the solvents (50 g each) were boiled for 4 weeks with 5 g sulfur in an N₂-atmosphere, using a reflux arrangement. A lead acetate solution was used to ascertain the amount of H₂S produced every day to determine the possible instability of the solvent investigated. As expected, no decomposition occurred.

There are claimed:

1. An electrochemical storage cell or battery operable in the range from about 100° C. to 200° C., of the alkali metal and sulfur type, with at least one anode chamber and at least one cathode chamber separated from each other by an alkali ion-conducting solid electrolyte, and at least one organic aprotic solvent having a boiling point above the operating temperature of the cell, contained in the cathode chamber for dissolving, at least partially, alkali compounds contained in the cathode chamber, the improvement comprising adding to the cathode chamber, another organic solvent component containing a compound having the general formula

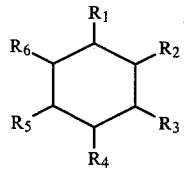

wherein $R_1$, $R_2$, $R_3$, $R_4$, $R_5$ and $R_6$ each represent a radical selected from the group A, B and C in which
A=H
B=CH₃
C=F, Cl, CN and SCN
and where a radical from A and C are each represented at least once and a radical of B not more than three times.

2. Storage cell or battery according to claim 1, wherein a radical of B is represented two to three times, and wherein like radicals are arranged as closely adjacent as possible.

3. Storage cell or battery according to claim 1, wherein a radical of C is represented two to three times and wherein like radicals are arranged as closely adjacent as possible.

4. An electrochemical storage cell or battery operable in the range from about 100° C. to 200° C., of the alkali metal and sulfur type, with at least one anode chamber and at least one cathode chamber separated from each other by an alkali ion-conducting solid electrolyte, and at least one organic aprotic solvent having a boiling point above the operating temperature of the cell, contained in the cathode chamber for dissolving, at least partially, alkali compounds contained in the cathode chamber, the improvement comprising adding to the cathode chamber another organic solvent component containing a compound having the general formula

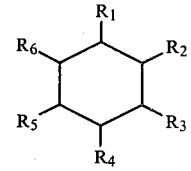

wherein $R_1$, $R_2$, $R_3$, $R_4$, $R_5$ and $R_6$ each represent a radical selected from the group A, B and C in which
A=H
B=CH₃
C=F, Cl, CN and SCN
and where a radical of B and a radical of C are each represented two to three times.

5. Storage cell or battery according to claim 1, wherein said added compound is p-cyanotoluol.

6. Storage cell or battery according to claim 1, wherein said added compound is o-cyanotoluol.

7. Storage cell or battery according to claim 1, wherein said added compound is 3, 4-dicyanotoluol.

8. Storage cell or battery according to claim 1, wherein said added compound is 3, 4, 5-tricyanotoluol.

9. Storage cell or battery according to claim 1, wherein said added compound is 1, 2-dicyano- 4, 5-dimethyl-benzene.

10. Storage cell or battery according to claim 1, wherein said added compound is 1-cyano-, 3, 4, 5-trimethyl-benzene.

11. Storage cell or battery according to claim 4, wherein said added compound is 1, 2, 3-tricyano- 4, 5, 6-timethyl-benzene.

12. Storage cell or battery according to claim 1, wherein said added compound is fluorobenzene.

13. An electrochemical storage cell or battery operable in the range from about 100° C. to 200° C., of the alkali metal and sulfur tupe, with at least one anode chamber and at least one cathode chamber separated from each other by an alkali ion-conducting solid electrolyte, and at least one organic aprotic solvent having a boiling point above the operating temperature of the cell, contained in the cathode chamber for dissolving, at least partially, alkali compounds contained in the cathode chamber, the improvement comprising adding xylol as another organic solvent component to the cathode chamber.

14. Storage cell or battery according to claim 13, wherein the xylol is a mixture of o-, m- and p-xylene.

* * * * *